(12) United States Patent
Bruks

(10) Patent No.: US 7,530,376 B2
(45) Date of Patent: May 12, 2009

(54) LOAD CARRIER FOR TRANSPORTING LOGGING RESIDUES

(75) Inventor: Allan Bruks, Järfälla (SE)

(73) Assignee: Allan Bruks AB, Jarfalla (SE)

( * ) Notice: Subject to any disclaimer, the term of this patent is extended or adjusted under 35 U.S.C. 154(b) by 707 days.

(21) Appl. No.: 10/542,381

(22) PCT Filed: Dec. 20, 2004

(86) PCT No.: PCT/SE2004/001945

§ 371 (c)(1),
(2), (4) Date: Jul. 14, 2005

(87) PCT Pub. No.: WO2005/058017

PCT Pub. Date: Jun. 30, 2005

(65) Prior Publication Data

US 2006/0104776 A1    May 18, 2006

(30) Foreign Application Priority Data

Dec. 19, 2003   (SE)   .................................... 0303437

(51) Int. Cl.
*A01G 23/08* (2006.01)
(52) U.S. Cl. ...................................... 144/4.1; 144/34.1
(58) Field of Classification Search .................. 144/4.1, 144/34.1; 414/23, 331.01, 467, 468, 470
See application file for complete search history.

(56) References Cited

U.S. PATENT DOCUMENTS

| 3,395,637 | A | * | 8/1968 | Larsson et al. | ............... | 100/212 |
| 4,119,222 | A | * | 10/1978 | Kaarnametsa | ............... | 414/470 |
| 4,911,215 | A | * | 3/1990 | Phipps | ...................... | 144/337 |
| 4,984,961 | A | * | 1/1991 | Herolf | ........................ | 414/812 |
| 5,769,586 | A | * | 6/1998 | Schulte | ........................ | 414/23 |

* cited by examiner

*Primary Examiner*—Shelley Self
(74) *Attorney, Agent, or Firm*—Browdy and Neimark, P.L.L.C.

(57) ABSTRACT

A load carrier (10) for transporting logging residues comprises a horizontal frame (14) and a load-accommodating rack (15) mounted on the frame. The rack (15) includes a rack bottom (20) and a pair of upstanding rack side members (21, 22) mounted on the rack bottom along respective opposite sides of the rack bottom. An upstanding rack support (23) is provided on the frame (14) along a longitudinal side thereof. An upper end of one of the rack side members (21) is pivotally connected to the top end of the rack support (23). The rack (15) is pivotable relative to the rack support (23) and the frame (15) through an angle greater than 90° about a horizontal axis between a lower load-accommodating position with the rack bottom (20) resting on the frame (14) and a position for gravity dumping of a load of logging residues held in the rack (15) onto the ground by the side of the load carrier.

7 Claims, 5 Drawing Sheets

LOAD CARRIER FOR TRANSPORTING LOGGING RESIDUES

This invention relates to machines used for transporting forestry products from a cutting site to a landing and, more particularly, to a load carrier and a machine of the kinds defined in the independent claims.

In logging and forest thinning operations, substantial quantities of parts of trees, such as tree tops and branches, and also small whole trees, remain after logs, such as saw timber and pulpwood, have been extracted. In the context of the present application, such parts of trees, and also small trees, are collectively referred to as logging residues.

There is nowadays widespread ambition to recover logging residues and reprocess them to by-products, such as wood chips for use as biomass fuel, rather than leaving them on the ground at the cutting or thinning site. However, economical use of the logging residues is possible only if they can be rationally collected at the cutting or thinning site and transported to a landing, such as by the side of a forest motor road, either for reprocessing at the landing or for further transport to a reprocessing installation.

Prior art devices for bringing logging residues to a landing include a motorized wheeled or tracked vehicle, a forwarder, for collecting logging residues and forwarding them to a landing. The forwarder comprises a load carrier with a bottom and sides forming an upwardly open load-accommodating rack (also called bunk), into which logging residues are loaded. A crane mounted on the forwarder and provided with a grapple is used to pick up logging residues from the ground and dumping them into the rack and to unload the logging residues at the landing.

In one prior art forwarder the rack sides can be tilted outwardly on a rack bottom to widen the open top of the rack and thereby facilitate the dumping of the logging residues and increase the load-accommodating capacity of the rack. When the loading of the logging residues is completed, the rack sides are raised to their normal upright transit position. If desired, the rack sides can be tilted outwardly again at the landing to facilitate unloading of the rack. Nevertheless, the unloading of the logging residues is undesirably time-consuming.

An object of the invention is to provide an improved load carrier which lends itself to quick unloading the logging residues from the rack.

Another object of the invention is to provide an improved load carrier which is capable of dumping its load of logging residues on top of a previously dumped load of logging residues.

A further object of the invention is to provide a machine for felling small trees and loading them into a load carrier in a single operation.

In view of these and other objects, the invention provides a load carrier as set forth in independent claim 1 and the claims dependent thereon and a machine as set forth in independent claim 6 and the claims dependent thereon.

The above and other objects of the invention and the features by which these objects are achieved, the applicability and advantages of the invention will become apparent from the following detailed description of an exemplary embodiment, reference being had to the accompanying schematic drawings.

Figure 1:
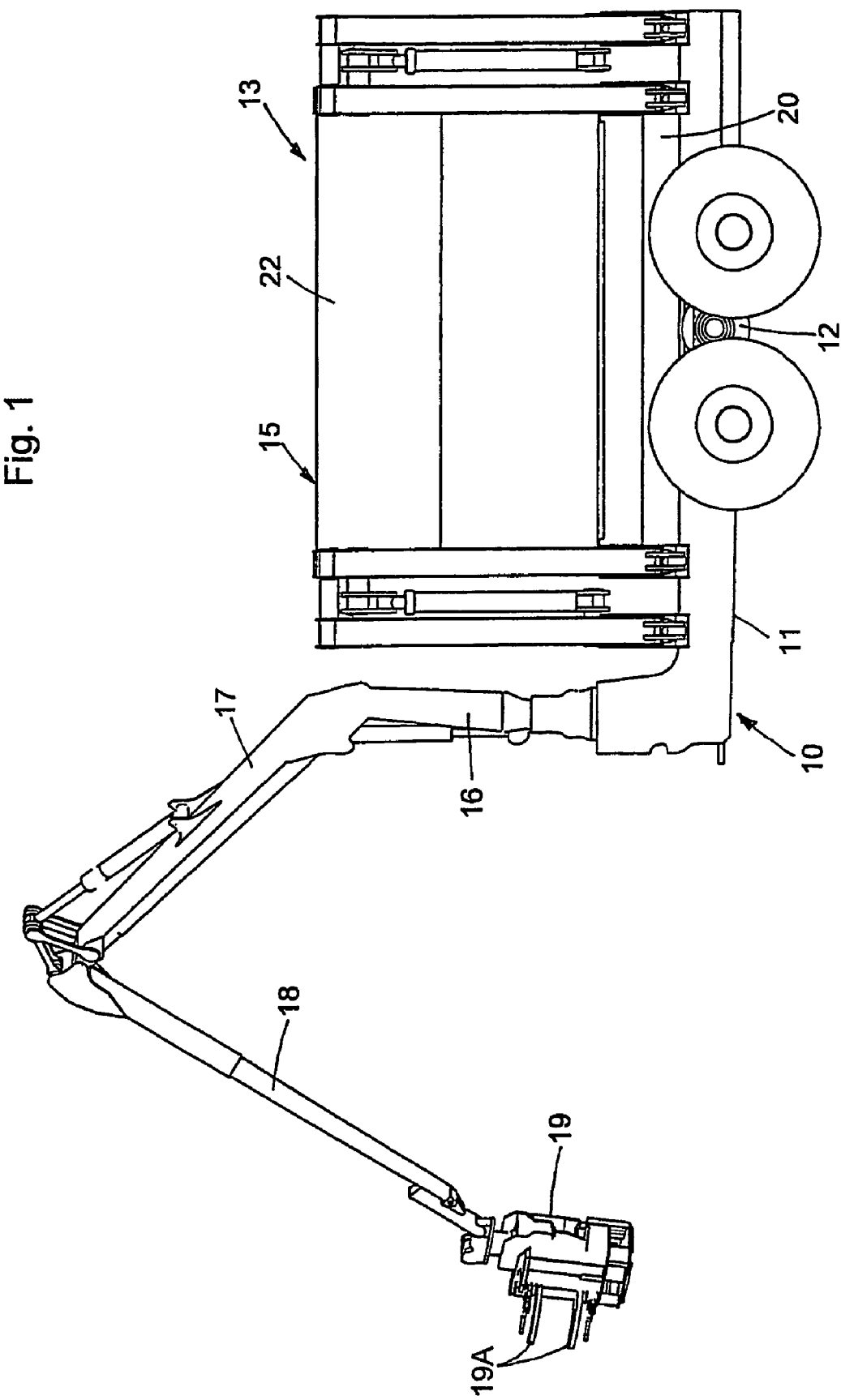
FIG. 1 is a side view if a machine according to the invention, including a wheeled load carrier according to the invention and a load-handling device.

As diagrammatically shown in FIG. 1, the illustrated machine comprises a forwarder vehicle 10 which includes a chassis 11 supported on a four-wheel bogie 12, a load carrier 13, which includes a frame 14 (a part of which is also part of the chassis 11) and a load-accommodating rack (bunk) 15, and a slewing knuckle boom crane 16 having two boom arms 17 and 18 carrying an accumulating felling head 19 at the outer end of the outer boom arm 18. Instead of the felling head 19, the crane can carry a rotatable grapple (not shown). In use of the machine, the forwarder vehicle 10 is connected to a tractor, not shown, provided with an operator cab from which the functions of the machine are controlled. Apart from the load carrier 13, the various components of the machine may be conventional and need not, therefore, be described in greater detail. Accordingly, the following description will be focused on the load carrier 13.

Generally speaking, the rack 15 of the load carrier 13 is shaped as a U-channel or trough and thus is open at both ends. It comprises a rack bottom 20 and a pair of rack side members 21 and 22 which define together with the rack bottom 20 a load space S for accommodating a load of logging residues to be transported from a cutting site to a landing where the load is dumped onto the ground.

The frame 14 of the load carrier 13 is provided with an upstanding rack support 23 formed by a pair of arms mounted near one of the longitudinal sides of the frame 14, that is, abreast of one end of transverse front and rear end members 14A of the frame. A pair of horizontal aligned axles 24 connect the upper end of the rack side member 21, and thereby the entire rack 15, for pivotal movement relative to the frame 14 between a lower position shown in FIGS. 1 to 3 and a raised position shown in FIG. 6. The pivoting movement is effected by means of a pair of linear actuators represented by a pair of double-acting hydraulic cylinders 25 connected between the arms of the rack support arms, on the one hand, and the rack side member 21, on the other hand. In the lower position, in which the rack 15 rests on the frame 14, logging residues can be loaded into the rack by means of the crane 16 and the felling head 19 as will be described below. In the raised position of the rack 15, the load of logging residues in the rack can be unloaded by gravity, dumped, onto the ground by the side of the vehicle 10, e.g., by the side of a forest road.

Figure 3:
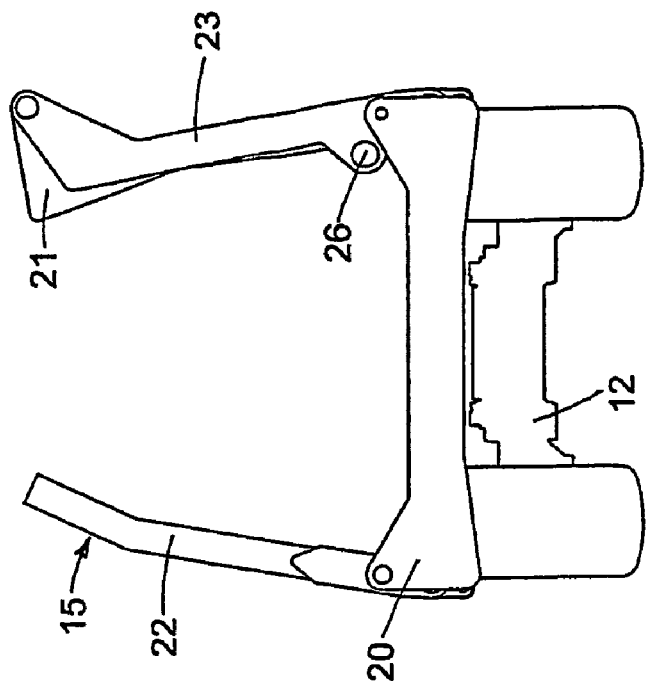
FIGS. 2 and 3 are rear views of the load carrier in respectively a loading position and a load-compacting position.
Figure 2:
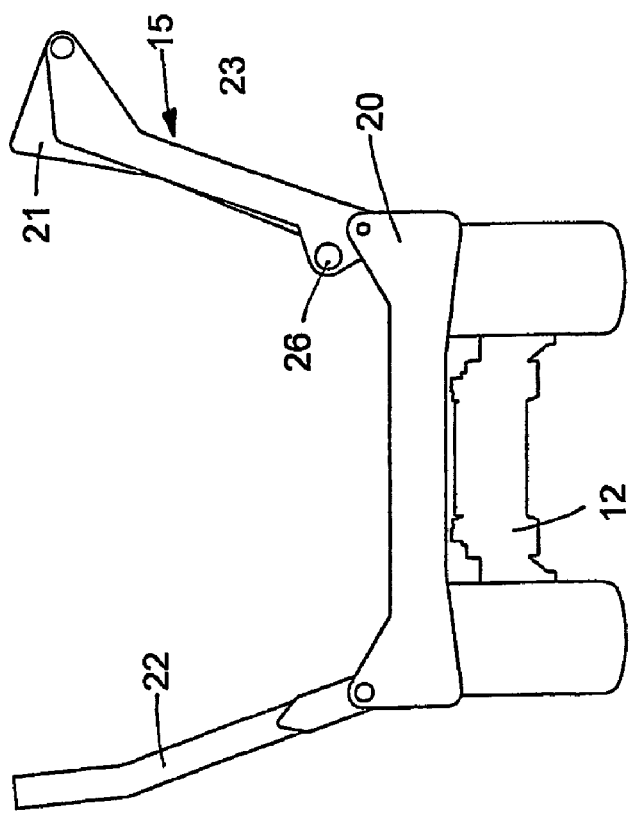

As is apparent from FIGS. 2 and 3, the rack support 23, and thus also the rack side member 21, as well as the rack side member 22, can be tilted sideways from a vertical or nearly vertical position to an outwardly tilted position shown in FIG. 2 so that the side members 21, 22 diverge in the upward direction, and to an inwardly tilted position so that the side members 21, 22 converge in the upward direction. Tilting of the side members outwardly widens the open upper side of the load space S and thereby facilitates loading of logging residues and increases the load-accommodating capacity. Inward tilting of the side members compacts the load of logging residues accommodated in the load space S.

Figure 5:
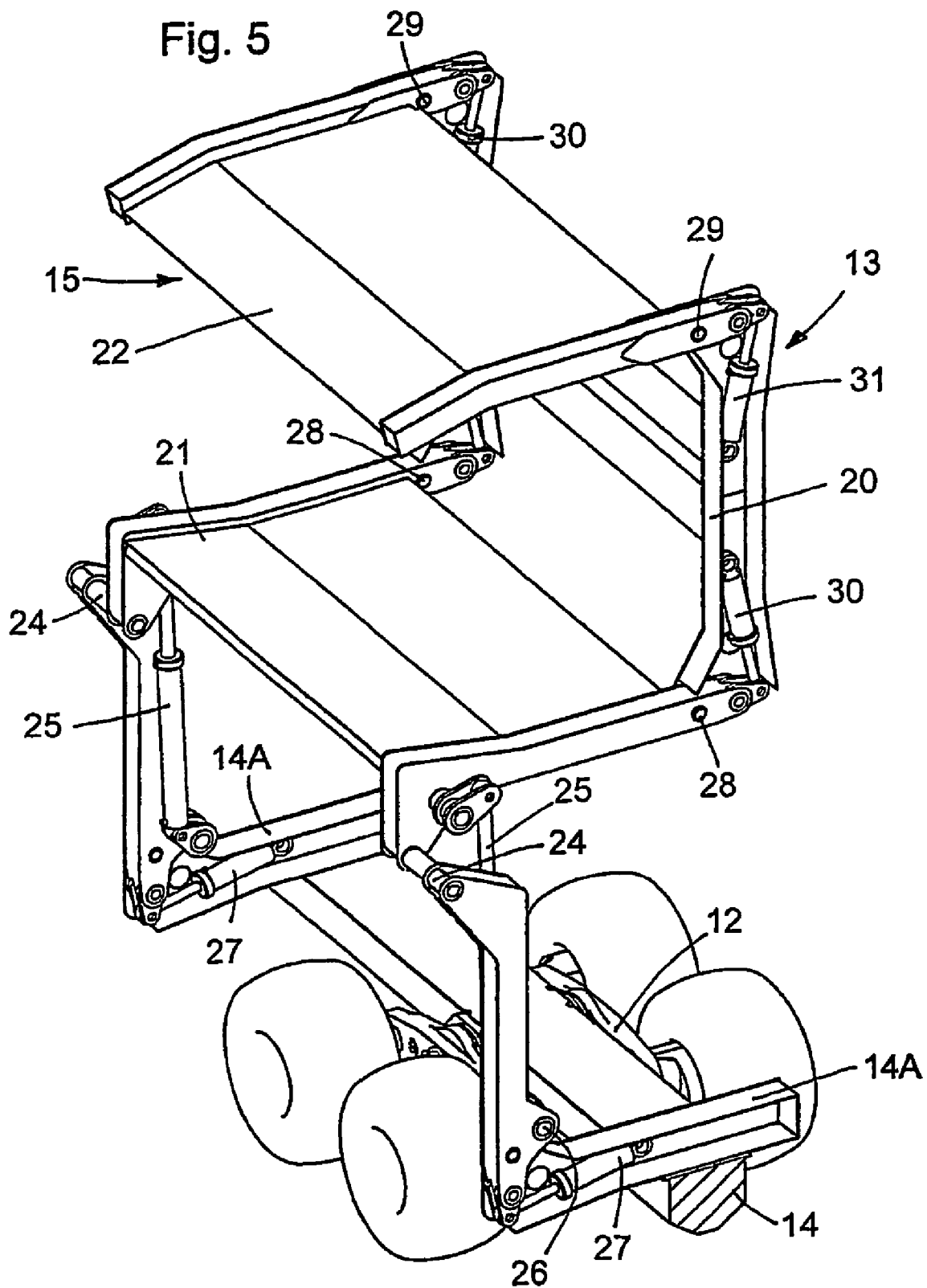

To permit tilting of the rack support 23, a pair of horizontal aligned axles 26, which are parallel to the axles 24, pivotally connect the rack support arms to the end members 14A of the frame 14. Tilting is effected by means of hydraulic actuators represented by a pair of double-acting hydraulic cylinders 27, shown in FIG. 5, which are connected between the end members 14A, on the one hand, and the arms of the rack support 23, on the other hand.

To permit tilting of the rack side member 21 relative to the rack bottom 20, a pair of horizontal aligned axles 28 pivotally connect that rack side member to one side of the rack bottom. Similarly, to permit tilting of the rack side member 22 relative to the rack bottom 20, a pair of horizontal aligned axles 29 pivotally connect that side member to the other side of the rack bottom. The tilting is effected for each rack side member 21, 22 by a pair of hydraulic actuators represented by double-acting hydraulic cylinders 30 and 31 shown in FIG. 5.

Preferably, the rack side members 21, 22 can be tilted 30 to 45 degrees outwardly and 10 to 15 degrees inwardly from the vertical.

When the knuckle boom crane 16 is equipped with the feller head 19 as shown, the forest residues to be loaded primarily are trees that are too small to yield logs of adequate size or quality but suitable for reprocessing into biomass fuel.

In operation of the illustrated machine, the operator engages the feller head 19 with a standing tree and actuates a gripping mechanism 19A incorporated in the feller head to cause it to grip the tree firmly and cut it below the gripping mechanism. He then operates the crane 16 to lift the tree from the stump and place it in the load space S of the rack 15. Preferably, the rack side members 21, 22 are tilted outwardly as indicated in FIG. 2 during loading of the rack.

As already mentioned, the feller head 19 is a so-called accumulating feller head (such feller heads are well known). Accordingly, the cut trees need not be moved one by one from the stump to the rack 15. Instead, the operator, having cut a tree, can make the gripping mechanism 19A hold the cut tree and move the felling head to a new tree and cut that tree, which is also held in the felling head by the gripping mechanism 19A after it has been cut. Operating the feller head 19 in that manner, the operator can cut several trees and form a bunch of trees held in the feller head before he moves the feller head to a suitable position above the rack 15 and drops the whole bunch of trees into the rack. Since there is no need first to place each cut tree on the ground to form a bunch as is conventional, and then, in a separate loading operation, to grip the trees again, one by one or in bunches, and move them to the load space S of the rack 15, the productivity of the cutting and loading operation is improved.

Naturally, the illustrated machine can also be operated in the conventional manner with the feller head 19 replaced with a separate gripping mechanism, such as conventional grapple (not shown) for picking up logging residues from the ground.

If desired, the rack side members 21, 22 can be moved to the compacting position as shown in FIG. 3 at suitable intervals during the loading of logging residues to compact the logging residues already loaded, thereby increasing the quantity of logging residues that the rack 15 can accommodate.

Figure 4:
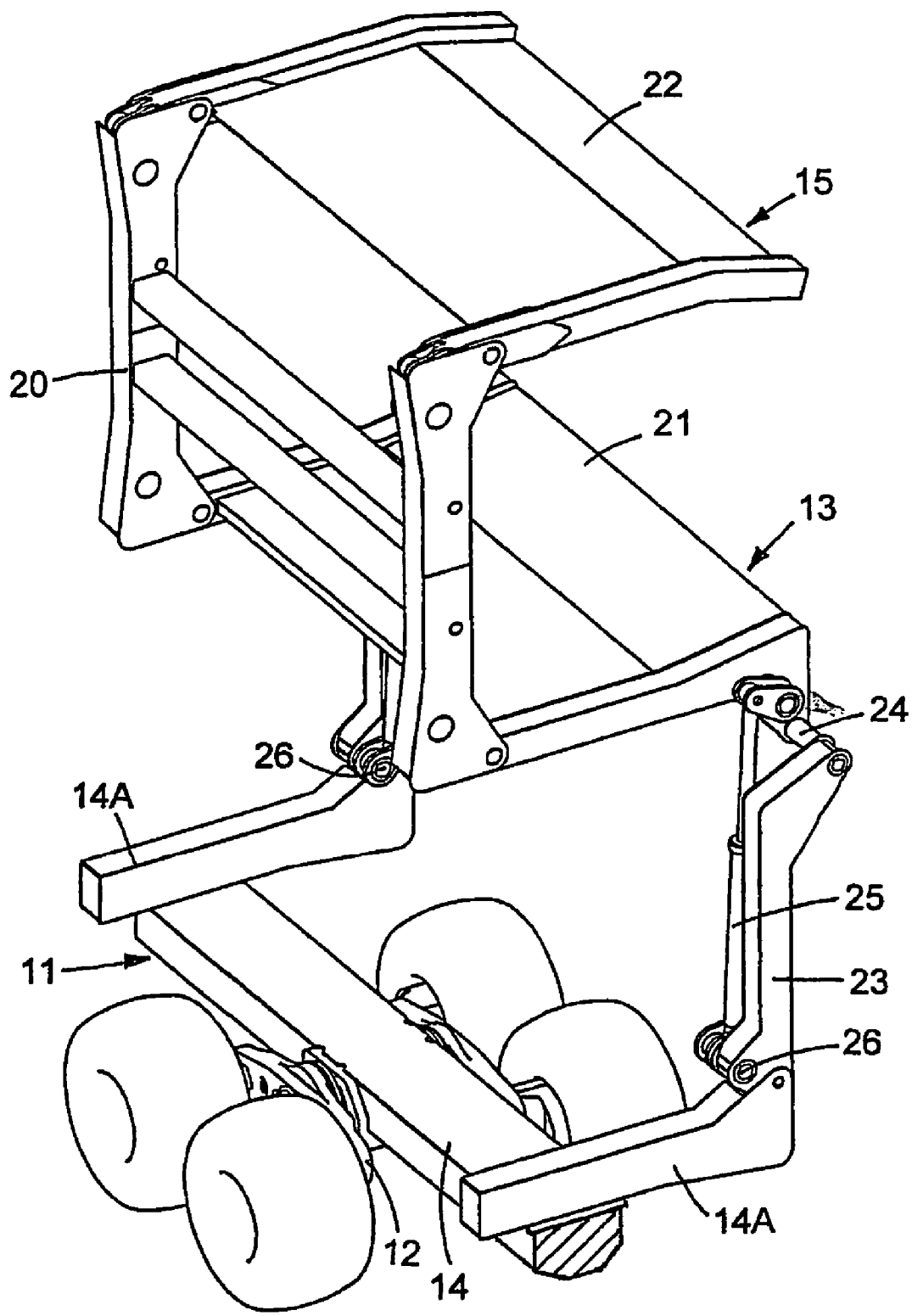
FIGS. 4 and 5 are respectively a rear and a front perspective view of a load-accommodating rack of the load carrier in an intermediate raised position.
Figure 6:
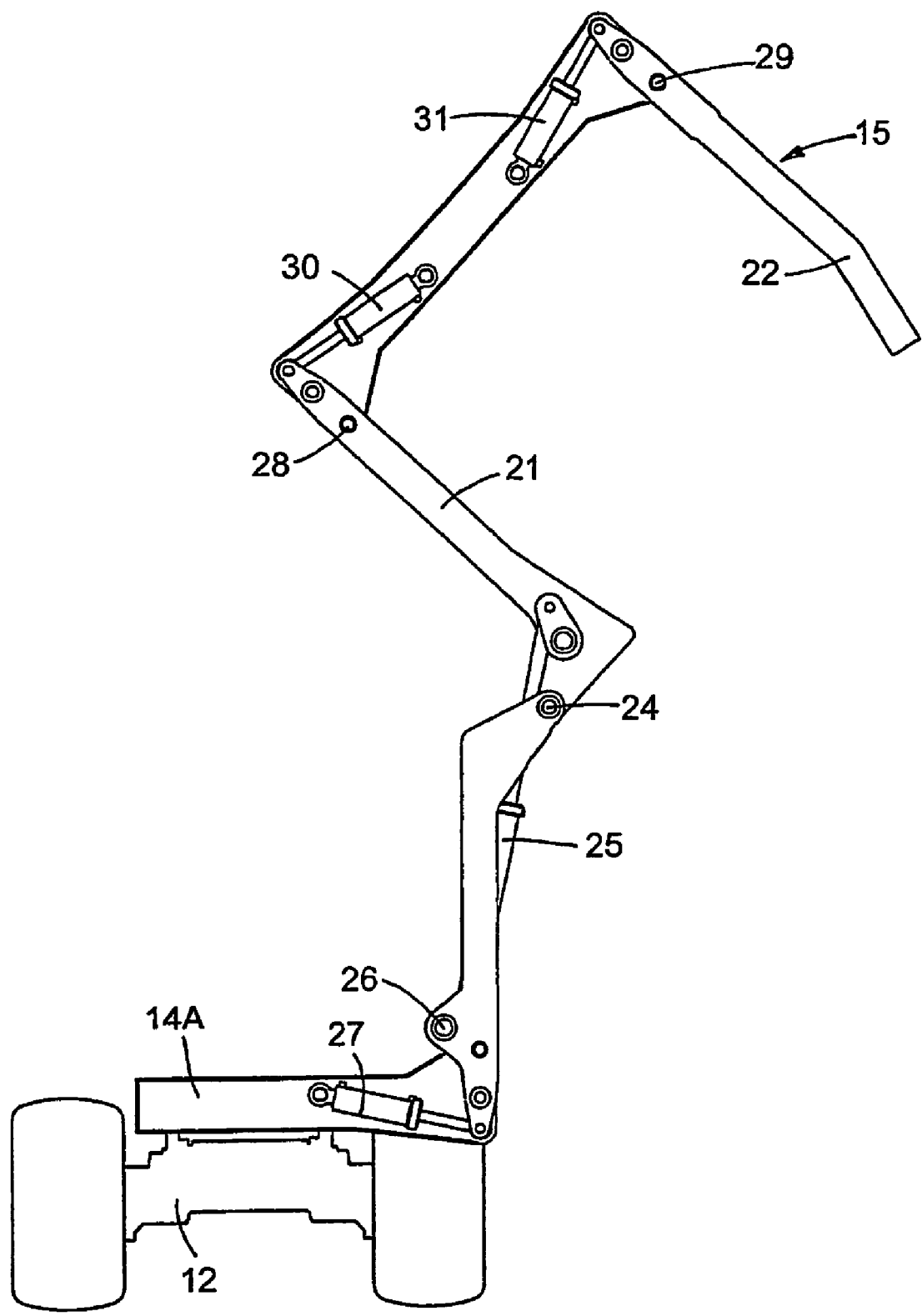
FIG. 6 is a rear view of the load carrier showing the load-accommodating rack in a further raised position for dumping a load onto the ground by the side of the load carrier.

When the rack 15 is filled with logging residues, the machine travels to the landing where the rack is raised to the inverted position shown in FIG. 6 to dump the load of logging residues onto the ground by the side of the load carrier 13. When the dumping takes place, the rack side members 21, 22 preferably are moved from the compacting position to the position shown in FIGS. 4 to 6 to facilitate the dumping. If desired, the rack side members 21, 22 may be tilted slightly outwardly to ensure that the load will easily slide from the rack 15. Care must be taken, however, to ensure that the rack is not moved too far sideways, because an excessive sideways movement outwardly may upset the balance of the entire load carrier 13 and cause it to overturn. It is preferable, therefore, to limit the angle through which the rack 15 can be turned, e.g. to 145 degrees as shown in FIG. 6.

Since the load of logging residues is dumped from a high position, it is possible to dump a load on top of one or more loads already dumped onto the ground, so that the available ground space at the landing can be utilized in an optimal manner.

In the illustrated embodiment of the invention, the load carrier 13 is designed as a more or less permanent part of the wheeled chassis 11. However, the load carrier 13 may also be designed as an add-on or attachment that can readily be connected to and disconnected from a chassis, such as a conventional forwarder chassis, that is also used for purposes other than transporting logging residues.

The invention claims is:

1. A load carrier for transporting logging residues, comprising
   a horizontal frame, and
   a rack mounted on the frame and including a rack bottom and a pair of upstanding rack side members mounted on the rack bottom along respective opposite sides of the rack bottom to form together with the rack bottom an upwardly open load space for accommodating a load of logging residues, wherein
   an upstanding rack support is provided on the frame along a longitudinal side of the frame,
   an upper end of one of the rack side members is connected to the top end of the rack support, and
   the rack is pivotable relative to the rack support and the frame through an angle greater than 90 degrees about a horizontal axis between a lower load-accommodating position with the rack bottom resting on the frame and a position for gravity dumping of a load of logging residues held in the rack onto the ground by the side of the load carrier.

2. A load carrier as claimed in claim 1 including at least one hydraulic actuator operatively connected between the frame and said one rack side member to pivot the rack about said horizontal axis between the load-accommodating and load-dumping positions.

3. A load carrier as claimed in claim 1 or 2, wherein the rack support is tiltable relative to the frame about a horizontal axis between a load-accommodating position, in which the rack support is tilted away from the other rack side member, and a load compacting position, in which the rack support the other rack side member, at least one hydraulic actuator being operatively connected between the frame and the rack support to effect said tilting of the rack support, and wherein both rack side members are tiltable relative to the rack bottom about respective horizontal axes between a load-accommodating position, in which each rack side member is tilted away from the other rack side member so that the rack side members diverge upwardly, and a load compacting position, in which each rack side member is tilted towards the other rack side member so that the rack side members converge upwardly, a hydraulic actuator being operatively connected between each rack side member and the rack bottom to effect said tilting of the side members.

4. A load carrier as claimed in any one of claims 1 to 2, including a wheeled chassis supporting said frame of the rack.

5. A load carrier as claimed in claim 4, including a knuckle boom crane supporting a feller head having a gripping mechanism for gripping and holding trees.

6. A load carrier as claimed in claim 3, including a wheeled chassis supporting said frame of the rack.

7. A load carrier as claimed in claim 6, including a knuckle boom crane supporting a feller head having a gripping mechanism for gripping and holding trees.

* * * * *